US005391385A

United States Patent [19]

Seybold

[11] Patent Number: 5,391,385

[45] Date of Patent: Feb. 21, 1995

[54] METHOD OF FRYING OIL TREATMENT USING AN ALUMINA AND AMORPHOUS SILICA COMPOSITION

[75] Inventor: Jed C. Seybold, Exton, Pa.

[73] Assignee: The PQ Corporation, Valley Forge, Pa.

[21] Appl. No.: 91,399

[22] Filed: Jul. 13, 1993

Related U.S. Application Data

[63] Continuation of Ser. No. 833,598, Feb. 10, 1992, abandoned, which is a continuation of Ser. No. 480,685, Feb. 15, 1990, abandoned.

[51] Int. Cl.[6] .......................... A23D 9/00; C11B 3/00

[52] U.S. Cl. .................................... 426/417; 426/423; 502/407; 502/414; 554/194; 554/196

[58] Field of Search ............... 426/417, 422, 423, 495; 554/175, 176, 193, 191, 194, 196; 502/405, 407, 414, 415

[56] References Cited

U.S. PATENT DOCUMENTS

| | | | |
|---|---|---|---|
| 3,947,602 | 3/1976 | Clewell, Jr. et al. . | |
| 4,330,564 | 5/1982 | Friedman . | |
| 4,629,588 | 12/1986 | Welsh et al. . | |
| 4,681,768 | 7/1987 | Mulflur et al. . | |
| 4,734,226 | 3/1988 | Parker et al. | 426/417 |
| 4,735,815 | 4/1988 | Taylor et al. | 426/417 |
| 4,764,384 | 8/1988 | Gyann . | |
| 4,812,436 | 3/1989 | Staal et al. . | |
| 4,880,652 | 11/1989 | Regutti | 426/417 |
| 4,956,126 | 9/1990 | Staal et al. . | |

FOREIGN PATENT DOCUMENTS 0269173 1/1988 European Pat. Off. .

OTHER PUBLICATIONS

English Abstract for Japanese application 58–020152(A) dated Apr. 15, 1983.

English Abstract for Japanese application 59–12929-7(A) dated Jul. 25, 1984.

*Primary Examiner*—Donald E. Czaja

*Assistant Examiner*—Leslie Wong

*Attorney, Agent, or Firm*—Ratner & Prestia

[57] ABSTRACT

The treatment of cooking oil with a combination of alumina and amorphous silica is disclosed. This combination, preferably with a silica hydrogel and a hydrated alumina, reduces all contaminants known to degrade the oil without introducing metals or increasing undesirable soaps.

14 Claims, No Drawings

METHOD OF FRYING OIL TREATMENT USING AN ALUMINA AND AMORPHOUS SILICA COMPOSITION

This application is a continuation of application Ser. No. 07/833,598, filed Feb. 19, 1992, now abandoned. which is a continuation of application Ser. No. 07/480,685, filed Feb. 15, 1990, now abandoned.

BACKGROUND OF THE INVENTION

This invention relates to a composition and method to remove major contaminants that accumulate as fats and oils are used to fry foods such as potato chips, chicken, french fries, etc. In particular, my invention provides for using a blend of synthetic amorphous silica gel and alumina to rejuvenate cooking oils used in the frying of various foods. The term oil(s) or frying oil(s) as used herein include materials of vegetable and animal origin. Examples include oils and fats derived from soybeans, cottonseeds, peanuts, olives, palm seeds, canola/-rapeseeds and corn as well as beef fat or tallow. Frying oils are often combinations of these materials.

Frying oils decompose over time and use due to the formation and acquisition of various contaminants during cooking. Soaps, polar compounds, polymers, free fatty acids (FFA), color bodies and trace metals are the major contaminants which contribute to oil degradation through increased instability. The cooking process and the accumulation of these contaminants also result in a visibly darker color to the oil which can be displeasing in appearance. The longer the oil is used without treatment, the higher the levels of contaminants and the darker the color becomes. See Table 1, which summarizes data from my experiments.

TABLE 1

| Oil Type | Cooking Time | Color Red/ Yellow | FFA Wt % | Stability (Peroxide Value) | Soaps ppm | Polar Compounds Wt % |
|---|---|---|---|---|---|---|
| Fresh | — | .2/.6 | .01 | 2.5 | 2 | 2.4 |
| Peanut | 3 days | 4.4/40 | .05 | 2.8 | — | — |
| Peanut | 7 days | 22/59 | .53 | 10.4 | — | — |
| Peanut | 1 days | 1.7/— | .05 | — | 40 | 14.0 |

The above results also demonstrate a higher peroxide value (PV), which is a known indicator for oil stability. The higher the PV, the greater the instability of the oil; therefore, the oil will oxidize and become rancid more quickly.

Each of these contaminants can contribute different problems to the frying oil and to the food being fried therein. FFA can react with the trace metals found in oil to form soaps. The formation of soaps can result in higher oil absorption by the food being fried. This can result in a greasier product, as well as an overcooked or harder finished food product, internally as well as on the surface. The presence of soaps also causes excessive foaming of the oil. Such foaming, if unchecked, is known to be a safety hazard for the operators of the frying equipment.

Polar compounds can contribute to off flavors in the product, as well as increased oxidation of the oil. Trace metals such as Mg, P, Cu and Fe can react with oxygen from the air to catalyze the oxidation process resulting in a high PV of the oil. This causes the oil to become rancid in a much shorter time. Products that contain oil with a high PV value degrade more quickly when stored.

FFA, along with polar compounds, can also result in the formation of film or coke deposits along the side of frying equipment.

Compositions and methods have been suggested for removing the many impurities from used oils. None of these have specifically addressed the removal of all the contaminants that degrade the oil, but have singularly attacked the contaminants believed to be most troublesome in a specific system. For example, calcium and magnesium silicates are currently marketed as active filter aids specifically for FFA reduction. These products have been shown to reduce FFA, but at the expense of forming soaps or releasing calcium or magnesium metals into the frying medium. See Table 2, which summarizes data from my experiments that support this finding.

TABLE 2

| Oil | Treatment | FFA Wt % | Metals ppm | Soaps ppm |
|---|---|---|---|---|
| Tallow/CSO | Untreated | 1.52 | <10 | 41.0 |
| Tallow/CSO | Ca Silicate | 1.02 | 120 | 150.0 |

A method and composition for treating used cooking oil by mixing said oil at a temperature of 300° F. with a composition of a porous carrier, water, and food compatible acid is disclosed in U.S. Pat. No. 4,330,564. The addition of the acid is apparently directed to counteracting soap formation.

Another method of treating cooking oil in which the cooking oil is contacted with food-compatible acid, followed by separation of the oil from the acid before reuse of the oil is disclosed in U.S. Pat. No. 3,947,602. The addition of the acid is apparently directed to counteracting soap formation.

U.S. Pat. No. 3,232,390 discloses a method of reducing the FFA content and increasing the smoke point of used cooking oil by mixing said oil with an adsorbent and then separating said adsorbent after about 3 to 15 minutes. The adsorbent is selected from a group consisting of alkaline earth oxides and carbonates. U.S. Pat. No. 4,681,768 discloses a method of reducing FFA content of used cooking oil wherein the oil is contacted with magnesium silicate of certain properties. The patent discloses that the magnesium silicate is hydrated.

U.S. Pat. Nos. 4,629,588 and 4,734,226 disclose the use of various silicas and acid-treated silicas in the "refining" of glyceride oils for removal of trace contaminants, specifically trace metals and phospholipids in the refining process. These patents, like those cited before, are narrow of scope and do not discuss the other contaminants found in used cooking oils.

U.S. Pat. No. 4,735,815 discloses a method of reducing FFA with a composition of activated clay or magnesium silicate and alumina derived from a gel, said composition containing 15% to 75% by weight of alumina. Color is also reduced, and extended service life is indicated.

All of these patents are directed to various aspects of refining or reclaiming various cooking or frying oils through removal of specific contaminants. None of the patents are directed to removing levels of all of the key contaminants that degrade frying oils. It is an object of this invention to reduce the level of all contaminants generally found in used cooking oils, specifically FFA, polar compounds, and color bodies, as well as the reduction of soaps and trace metals (Ca, Mg, P, Cu, Fe), by sorption on the surface of the adsorbent composition. It is a further objective to improve the stability of the oil by lowering the PV of the oil. It is another object of my invention to reduce foaming of used oil. It is a further objective to provide a composition of material that can remove or reduce all of the contaminants at the same time in a single process.

SUMMARY OF THE INVENTION

The present invention provides a composition for the treatment of certain oils consisting of amorphous silica and alumina which can provide desirable characteristics currently not offered by available oil treatments. This composition can be directly added to used hot cooking oil or refined unused glyceride oils to reduce the following contaminants:

- Trace Metals
- Soaps (Alkaline Contaminant Materials)
- Polar Compounds
- Color Bodies
- Free Fatty Acid (FFA)

The removal of these contaminants improves the stability of the used oil and provides a lower PV of said oil.

This composition removes the various contaminants either by adsorption or reaction on active sites. This is done without the negative effect of saponification (soap formation) or release of trace metals into the oil, both of which contribute to degradation of the oil.

The amorphous silica gel/alumina composition provides the following additional benefits:

- Reduced oil absorption by the food.
- Reduced sticking of food to the frying equipment.
- Reduced foaming of the frying medium.
- Improved stability of oil, thereby extending oil life.
- Extended shelf life of foods with high oil content (peanuts, potato chips, etc.)
- Easy filtration of adsorbent composition.

Along with the above benefits, the use of this treatment will provide substantial cost savings to the operator, as well as maintain food quality, improve operating safety of frying equipment, and reduce disposal requirements for used cooking oil.

The Invention

The contaminant levels and type of contaminants found in used frying oils depend on the type of frying oil and the type of food being fried. Fried chicken forms higher levels of FFA and soaps while snack foods, such as peanuts and potato chips, are lower in FFA but higher in metals and polar compounds. A composition of certain amorphous silicas and aluminas is particularly well suited for removal and/or reduction of the major contaminants (soaps, FFA, polar compounds, trace metals, color bodies) found in any oil used to fry any type of food (chicken, french fried potatoes, peanuts, potato chips, etc). The composition and its use can be most beneficial when applied to treat used cooking oil, but the adsorbent has been found to be effective in reducing polar compounds, FFA, and color bodies in fresh refined oil, as well.

The process of the removal of these trace contaminants, as described herein, essentially comprises the step of contacting a used frying oil containing any or all of the contaminants (soaps, FFA, polar compounds, color bodies, trace metals) with an adsorbent composition comprising a blend of amorphous silica and alumina, allowing sufficient contact time for these contaminants to be adsorbed, and separating the frying medium from the adsorbent.

The term "silica" as used in this process can refer to silica gels, fumed silicas or precipitated silicas. Both precipitated silicas and silica gels are derived from a soluble silicate by acidification, washing and ignition. A preferred silica gel used in the process of my invention contains a large amount of water, more than 45 percent on a weight basis compared to more familiar desiccant gels. Such hydrated silicas are called hydrogels. These materials are generally prepared by acidifying an alkali metal silicate to form a hydrosol which then sets to form a hydrogel. The hydrogel is washed free of salts and milled. Milling should be carried out so that the gel is not dried out. Fumed silicas are formed when $SiCl_4$ or $Si(OC_2H_5)_4$ are hydrolyzed in flame containing water vapor. Suitable amorphous silicas for this process are those with pore diameters greater than 30 Angstroms. In addition, a moisture content of greater than about 20 percent by weight is important to maintain the structure of the silica, as well as a surface area from 300 $m^2/mg$ to 1000 $m^2/gm$. The relatively large surface area is important as this provides sufficient active sites for the contaminants to be sorbed on the surface of the adsorbents.

The term "alumina" as used in this process can refer to activated alumina, calcined alumina, hydrated alumina, precipitated aluminas, or an alumina phase of pseudoboehmite, bayerite or gamma. Activated or calcined aluminas are generally prepared by leaching of bauxite with caustic soda followed by precipitation of a hydrated aluminum oxide by hydrolysis and seeding of the solution. The alumina hydrate is then washed, filtered and calcined to remove water and obtain anhydrous oxide. Precipitated and hydrated aluminas are generally made by a similar process where the bauxite ore is dissolved in a strong caustic and aluminum hydroxide precipitated from the sodium by neutralization (not with carbon dioxide) or by auto-precipitation. The aluminas of my invention are made by one of the above processes. The surface area of the alumina may vary from 150 to 1000 $m^2/gm$. $Al_2O_3$ content may vary from 65% to 99% by weight.

The exact formulation of the composition of my invention will vary depending on the type of oil, the type of contaminants to be removed from the used oil, and the type of alumina selected. The composition can vary from 99% alumina and 1% amorphous silica to 99% amorphous silica and 1% alumina. I prefer the composition to be 60% to 80% silica and 20% to 40% alumina.

It has been found that there is synergistic benefit gained in the use of the combination of an amorphous silica and alumina in treatment of both used frying oil and fresh refined oil. The combination removes more critical contaminants from the used frying oil than other products remove, and more than either silica or alumina remove. Table 3 further highlights and demonstrates the key benefits of the use of the composition of my invention.

TABLE 3

| Oil Type | Treatment | Polar Compds. Wt % | Soaps ppm | Color Red/Yellow | FFA Wt % | Metals (ppm) Ca | Mg | P | Cu | Fe |
|---|---|---|---|---|---|---|---|---|---|---|
| Soybean[1] | Untreated | 3.5 | 3.5 | 6.0/50.0 | 1.60 | — | — | — | — | — |
| Soybean[1] | Amorphous Silica | 3.6 | 1.3 | 5.9/35.0 | — | — | — | — | — | |
| Soybean[1] | Silica/Alumina | 3.1 | 1.0 | 6.0/50.0 | 1.60 | — | — | — | — | — |
| Peanut[2] | Untreated | 14.0 | 40.0 | 1.7/— | 0.46 | 39.0 | 12.0 | 3.6 | 1.4 | 2.7 |
| Peanut[2] | Silica/Alumina | 11.0 | 3.0 | 1.2/— | 0.20 | 4.5 | 1.3 | 2.8 | 0.7 | 0.8 |
| Tallow | Untreated | 20.0 | 41.0 | 30.0/3.1 | 1.52 | — | — | — | — | — |
| Blend[3] | Amorphous Silica | 17.9 | 2.0 | 2.2/14.0 | 1.52 | <10.0 | <10.0 | <50.0 | — | — |
| Blend[3] | Alumina | 19.1 | 32.0 | — | 1.05 | — | — | — | — | — |
| Tallow | Untreated | 7.1 | 4.2 | 11.0/— | .35 | .83 | .18 | 75.0 | .05 | 1.6 |
| Blend[4] | 70% $SiO_2$Gel/ 30% $AlO_2$ | 3.6 | 0 | 7.6/— | .17 | .43 | .04 | 26 | .02 | 1.6 |
| Tallow | Untreated | 17.7 | 20 | — | 2.6 | .61 | .23 | 57 | .05 | 1.9 |
| Blend[5] | 70% $SiO_2$Gel/ 30% $AlO_2$ | 17.6 | 3 | — | 1.7 | .36 | .07 | 39 | .02 | 1.6 |

[1]3- to 4-day old cooking oil used to fry french fried potatoes.
[2]Peanut oil used to fry potato chips.
[3]Blend of 90% tallow/10% cottonseed oil 3–4 days old used to fry french fried potatoes.
[4]Blend of 90% Tallow/10% cottonseed oil 1 day old used to fry french fried potatoes.
[5]Blend is 90% Tallow/10% cottonseed oil 3 days old used to fry french fried potatoes.

In addition to removing or reducing contaminants, these adsorbents reduce the PV for the used oil, thereby improving its stability and further enhancing the life of the oil, and/or improve the quality of the food fried with the treated oil.

While other methods require specific temperature conditions for their optimal use, the amorphous silica gel and alumina composition can be added to used frying oil or refined oil at temperatures of 180° F. to 400° F. The composition can be added directly to the oil. The contact time between my composition and the oil can vary from 1 minute to 20 minutes. The preferred treatment occurs when the process allows approximately 10 minutes of contact time with the used frying oil. Once the treatment is completed, the adsorbent of the invention is removed from the treated oil by any means well known in the art for this purpose, e.g., by filtering. Preferably, the oil is filtered hot.

The adsorbent can also be added to the process by placing it in a permeable container which is then placed in the oil. The container is constructed of such material that it is permeable to oil but not to the adsorbent composition; therefore the adsorbent is not released into the oil, so filtration is not required. When the adsorbent is spent, the container of adsorbent can be removed from the frying medium.

The composition of my invention can be a blend of amorphous silica and alumina particles. It can also be an integrated product wherein the alumina is dispersed in a silicate solution that is to be gelled or precipitated to form the silica. The process of my invention also admits other treatment agents. For example, zeolites, magnesium silicate, calcium silicate, various clays and other silica gels and precipitates can be added with the silica alumina composition, or can be added separately either before or after the addition of my composition.

A preferred composition of my invention can be prepared by mixing silica and the alumina in a ribbon blender. One can form mixtures of various proportions of the amorphous silica gel and alumina through adjustment of the feed. The preferred amorphous silica gel is generally a microbiologically pure silica hydrogel having the following properties:

| Chemical | |
|---|---|
| $SiO_2$, % wt/wt (on a dry basis) | 99.0% |
| Loss on Ignition, % wt/wt | 65–67% |
| pH, 25% aqueous suspension | 3.0 |
| Surface Area, $m^2$/gm | 800.0 |
| Micro, colonies/gram | 0 |
| Heavy Metals (as Pb), ppm | <10.0 |
| Iron, ppm | 20.0 |
| Copper, ppm | <0.1 |
| **Physical** | |
| Mean Particle Size, microns | 14 |
| Density, lbs/cu ft | 16–30 |

The alumina portion of the composition preferably has the following properties:

| Chemical | |
|---|---|
| $Al_2O_3$ | 75.8–69.4 |
| $SiO_2$, % wt/wt (on as-is basis) | 0.06–0.20 |
| $Fe_2O_3$ (on as-is basis) | 0.03–0.06 |
| $Na_2O$ (on as-is basis) | 0.02–0.09 |
| Cl (on as-is basis) | 0.07–0.30 |
| Loss on Ignition, % wt/wt | 24.0–30.0 |
| Trihydrate, % wt/wt | ~5.0 |
| **Physical** | |
| Surface Area, $m^2$/gm | 250–400 |
| Bulk Density, lbs/cu ft | 10–20 |

In each case, the frying characteristics of the oil were improved by removal of soaps, trace metals, FFA, color bodies and polar compounds. Further, this composition of amorphous silica gel and alumina can improve the stability of the oil by lowering the PV of the used or refined oil.

It will be understood that the embodiments described above are merely exemplary, and that persons skilled in the art may make variations and modifications without departing from the scope of the invention. All such modifications and variations are intended to be included within the scope of the invention as defined by the appended claims.

I claim:

1. A process for treating cooking oil containing contaminants comprising the steps of:
   a. heating said oil to a temperature of 180° F. to 400° F.;
   b. contacting said oil with a composition consisting of a mixture of 60% to 80% amorphous silica and 20 to 40% alumina for a time sufficient to remove contaminants from said oil; and c. separating said composition from the oil.

2. The process of claim 1, wherein the amorphous silica is selected from the group consisting of silica gel, precipitated silica and fumed silica, and the alumina is selected from the group consisting of activated alumina, calcined alumina, hydrated alumina, precipitated alumina, pseudoboehmite, bayerite and gamma alumina.

3. The process of claim 1 wherein the amorphous silica is a silica hydrogel.

4. The process of claim 1, wherein the amorphous silica is a silica hydrogel with an effective pore diameter of 30 Angstroms or more, a surface area of 300 to 1,000 $m^2/g$ and a loss on ignition of 65% to 67% wt/wt, and the alumina is a hydrated alumina with surface area of 150 to 1,000 $m^2g$ and a loss on ignition of 24% to 40% wt/wt.

5. The process of claim 1, wherein said oil is in contact with at least one half of one percent ($\frac{1}{2}$%) on a weight basis of the silica alumina composition.

6. The process of claim 5 wherein the amorphous silica is selected from the group consisting of silica gel, precipitated silica and fumed silica and the alumina is selected from the group consisting of activated alumina, calcined alumina, hydrated alumina, precipitated alumina, pseudoboehmite, bayerite and gamma alumina.

7. The process of claim 6 wherein the amorphous silica is a silica hydrogel with an effective pore diameter of 30 Angstroms or more, a surface area of 300 to 1,000 $m^2/g$ and a loss on ignition of 65% to 67% wt/wt, and the alumina is a hydrated alumina with surface area of 150 to 1,000 $m^2/g$ and a loss on ignition of 24% to 40% wt/wt.

8. The process of claim 1 wherein the oil is used fryer oil.

9. The process of claim 8 wherein the amorphous silica is selected from the group consisting of silica gel, precipitated silica and fumed silica, and the alumina is selected from the group consisting of activated alumina, calcined alumina, hydrated alumina, precipitated alumina, pseudoboehmite, bayerite and gamma alumina.

10. The process of claim 9 wherein the amorphous silica is a silica hydrogel with an effective pore diameter of 30 Angstroms or more, a surface area of 300 to 1,000 $m^2/g$ and a loss on ignition of 65% to 67% wt/wt, and the alumina is a hydrated alumina with surface area of 150 to 1,000 $m^2/g$ and a loss on ignition of 24% to 40% wt/wt.

11. The process of claim 8 wherein the silica alumina composition is maintained in an oil permeable container, and contact with the oil is maintained during the food frying process.

12. The process of claim 11 wherein the amorphous silica is selected from the group consisting of silica gel, precipitated silica and fumed silica, and the alumina is selected from the group consisting of activated alumina, calcined alumina, hydrated alumina, precipitated alumina, pseudoboehmite, bayerite and gamma alumina.

13. The process of claim 12 wherein the amorphous silica is a silica hydrogel with an effective pore diameter of 30 Angstroms or more, a surface area of 300 to 1,000 $m^2/g$ and a loss on ignition of 65% to 67% wt/wt, and the alumina is a hydrated alumina with surface area of 150 to 1,000 $m^2/g$ and a loss on ignition of 24% to 40% wt/wt.

14. The method of claim 1 wherein the amorphous silica is a hydrogel, the alumina is a hydrated alumina, and the composition contains 70% silica hydrogel and 30% hydrated alumina.

* * * * *